United States Patent
Huang et al.

(10) Patent No.: US 6,921,594 B2
(45) Date of Patent: Jul. 26, 2005

(54) EXHAUST TREATMENT AND FILTRATION SYSTEM FOR MOLTEN CARBONATE FUEL CELLS

(75) Inventors: Yinyan Huang, Framingham, MA (US); Scott Mackenzie, Lexington, MA (US); Amiram Bar-Ilan, Brookline, MA (US)

(73) Assignee: Sud-Chemie Inc., Louisville, KY (US)

( * ) Notice: Subject to any disclaimer, the term of this patent is extended or adjusted under 35 U.S.C. 154(b) by 280 days.

(21) Appl. No.: 10/025,662

(22) Filed: Dec. 19, 2001

(65) Prior Publication Data

US 2003/0113596 A1 Jun. 19, 2003

(51) Int. Cl.$^7$ .......................... H01M 8/14; H01M 8/00; H01M 2/00; B01D 39/00
(52) U.S. Cl. ............................. 429/16; 429/12; 429/13; 429/34; 429/41; 429/44; 55/522; 502/64; 502/69
(58) Field of Search ................................ 429/16, 12, 13, 429/34, 41, 44; 55/522; 502/64, 69

(56) References Cited

U.S. PATENT DOCUMENTS

| | | |
|---|---|---|
| 4,900,712 A | 2/1990 | Bar-Ilan et al. |
| 5,079,103 A | 1/1992 | Schramm |
| 5,206,202 A | 4/1993 | Lachman et al. |
| 5,213,912 A | 5/1993 | Kunz et al. |
| 5,308,456 A | 5/1994 | Kunz et al. |
| 5,354,720 A | 10/1994 | Leyrer et al. |
| 5,431,887 A | 7/1995 | Bar-Ilan |
| 5,443,803 A | 8/1995 | Mizuno et al. |
| 5,556,189 A | 9/1996 | Wallis |
| 5,693,298 A | 12/1997 | Bar-Ilan |
| 5,707,148 A | 1/1998 | Visser et al. |
| 5,773,423 A | 6/1998 | Jacobson et al. |
| 5,776,423 A | 7/1998 | Feeley et al. |
| 5,813,764 A | 9/1998 | Visser et al. |
| 6,004,896 A | 12/1999 | Addiego |
| 6,010,675 A | 1/2000 | Trocciola et al. |
| 6,080,377 A | 6/2000 | Deeba et al. |
| 6,093,378 A * | 7/2000 | Deeba et al. ............ 423/213.5 |
| 6,150,291 A | 11/2000 | Deeba et al. |
| 6,254,807 B1 | 7/2001 | Schmidt et al. |
| 6,299,995 B1 | 10/2001 | Abdo et al. |
| 6,352,578 B1 | 3/2002 | Sakata et al. |
| 6,660,240 B1 * | 12/2003 | Toshihiko et al. .......... 423/247 |

FOREIGN PATENT DOCUMENTS

JP    06283186    7/1994

OTHER PUBLICATIONS

Kordesch, et al., *Environmental Impact of Fuel Cell Technology*(Chem. Rev. 1995, pp. 191–207).

* cited by examiner

Primary Examiner—Patrick Joseph Ryan
Assistant Examiner—Angela J. Martin
(74) Attorney, Agent, or Firm—Scott R. Cox; Joan L. Simunic

(57) ABSTRACT

A filter system for adsorbing contaminants from an exhaust stream from a molten carbonate fuel cell including a filter substrate, a high surface area inorganic adsorbent secured to the filter substrate by an inorganic binder and an inorganic acid secured to the filter substrate. Also disclosed is a process for preparing the filter system for filtering exhaust gas from the molten carbonate fuel cell and a process for using the filtering system in a molten carbonate fuel cell system.

27 Claims, No Drawings

EXHAUST TREATMENT AND FILTRATION SYSTEM FOR MOLTEN CARBONATE FUEL CELLS

CROSS REFERENCE TO RELATED APPLICATIONS

NONE

BACKGROUND OF INVENTION

1. Field of Invention

This invention relates to an exhaust system for adsorbing contaminants from an exhaust stream of a molten carbonate fuel cell. More particularly, it relates to a filter system for adsorbing contaminants from a molten carbonate fuel cell, wherein the filter system includes a filter substrate, an inorganic adsorbent secured to the filter substrate by an inorganic binder and an acidic material coated onto the filter substrate. The invention also relates to a process for the preparation of and use of the filter system within a molten carbonate fuel cell system.

2. Description of Related Art

Fuel cell systems represent a new technological approach to supplying energy. There has been a great interest in fuel cell technology because energy can be produced by such cells with high efficiency without creating many of the problems that are common when using fossil fuels, especially the environmental problems.

A fuel cell is an electrochemical device which continuously converts chemical energy of a reducing agent and an oxidant fuel to electrical energy by a process involving an essentially invariant electrode—an electrolyte system. Fuel cells work at high efficiency with an emission level for undesirable pollutants far below that of the strictest industrial standards for conventional energy sources.

There are a number of different types of fuel cells with some classified based on working temperature and others classified by the fuels or oxidants that are used. Another method for distinguishing among different types of fuel cells is by the type of electrolyte that is used, such as alkaline fuel cells, phosphoric acid fuel cells, solid oxide fuel cells, proton exchange membrane fuel cells and molten carbonate fuel cells.

Molten carbonate fuel cells (MCFC) operate at about 600° C.–650° C. and typically comprise a reformer for converting hydrocarbon fuels to hydrogen and carbon monoxide, a burner and a plurality of molten carbonate fuel cell stacks. These fuel cells operate by reacting oxygen contained in an oxidant stream with carbon dioxide and free electrons at a cathode to produce carbonate ions. These carbonate ions migrate across a molten carbonate electrolyte to an anode where they react with hydrogen and carbon monoxide contained in a fuel system to produce water, carbon dioxide and free electrons. The free electrons pass through an external load back to the cathode thereby producing electricity while the carbon dioxide, water and any remaining hydrogen exits the anode into an exhaust stream. Typical MCFC systems also include an anode exhaust, downstream oxidation catalyst, which is located downstream from the fuel cell electrodes, and which oxidizes hydrocarbons, hydrogen and carbon monoxide contained in the exhaust stream. A general discussion of fuel cells, including molten carbonate fuel cell systems, is disclosed in Kordesch, et al., *Environment Impact of Fuel Cell Technology* (Chem. Rev. 1995, pp. 191–207). See also U.S. Pat. Nos. 5,308,456, 5,213,912 and 5,079,103.

The MCFC uses a molten carbonate salt mixture as the electrolyte. The composition of the electrolyte may vary but usually includes lithium carbonate and potassium carbonate. Because the operating temperature of the MCFC is about 600° C.–650°C., the carbonate salt mixture is liquid. During operation, some alkali carbonates are often discharged from the fuel cell stacks into the exhaust stream. Such alkali carbonates are poisonous to the downstream oxidation catalyst. These alkali carbonates may also poison other components of the fuel cell system. Thus, it is imperative that these alkali carbonate contaminants be removed from the exhaust stream of the MCFC system.

Monolithic catalyst adsorbents are commonly utilized to remove contaminants from various types of exhaust streams. For example, monolithic catalyst products having a cellular or honeycomb structure have been utilized in stationary emission control situations, food cooking facilities as disclosed in U.S. Pat. No. 5,431,887 and for chemical synthesis and processing facilities. Monolithic catalyst products are also utilized in the automotive industry and for NOx conversion in feed streams.

Catalyst adsorbent products of this type are generally fabricated by preparing a substantially homogeneous cellular ceramic or metallic monolithic structure and securing a catalyst adsorbent material to that monolithic structure.

The catalyst adsorbent product can also be formed by impregnating the monolithic structure with the catalyst adsorbent material and then heat treating the coated monolith to produce the final product.

Conventional washcoating techniques for production of catalytic monolith products generally comprise preparing a coating formed from a high surface area oxide blended with one or more catalytic adsorbents and dipping the monolith structure into that coating blend. These washcoats are then secured to the monolithic structure. Methods of coating a preformed high surface area washcoat onto a monolithic support are disclosed in U.S. Pat. Nos. 4,900,712, 5,431,887, 5,556,189 and 5,693,298.

Several patents disclose the combination of catalytically active washcoat compositions comprising an alumina binder and catalytically active noble metals for the oxidation of hydrocarbons and/or the reduction of nitrogen oxides for field abatement, automotive exhaust control and the like, including, for example, U.S. Pat. Nos. 6,150,291, 6,093,378, 6,080,377, 5,773,423 and 5,354,720.

In U.S. Pat. No. 5,206,202 a honeycomb substrate structure is coated with a catalytic iron/vanadium mixture blended with an alumina or titania binder.

In another example, U.S. Pat. No. 5,776,423 discloses a process for the preparation of a metallic zeolite catalyst adsorbent for NOx abatement. This patent discloses a process for the formation of a copper and iron ZSM-5 zeolite product using an alumina coating and silica sol binder. See also U.S. Pat. No. 6,150,291 and 5,354,720.

Other catalyst adsorbents for purifying exhaust gases are disclosed by U.S. Pat. Nos. 5,443,803 and 5,354,720. Each of these patents discloses the use of a silica sol as a binder for an active metal coated onto a monolithic structure.

U.S. Pat. No. 6,004,896 discloses a hydrocarbon absorber and a method of making same. A ZSM-5 zeolite is treated with phosphoric acid and then blended into a slurry for washcoating onto a monolithic structure. The preferred binder for the slurry is alumina, although the composition of the binder may also include silica and/or zirconia or their precursors.

U.S. Pat. No. 5,813,764 discloses a catalytic microcalorimeter sensor for monitoring exhaust gas conversions. The sensor disclosed is a washcoat obtained by mixing silica sol and alumina sol. The washcoat is used as the catalytic material itself and the components thereof are not used as binder materials. This patent also discloses the use of catalytically active metal particles. See the related patent, U.S. Pat. No. 5,707,148.

While monolithic catalyst adsorbent products having a cellular or honeycomb structure have increasingly been utilized for emission control situations, such as in the automotive industry or for the adsorption of gases in feed and exhaust streams, such as are created during some food preparation processes, the use of a catalyst adsorbent for adsorbing inorganic contaminants in a fuel cell, particularly a molten carbonate fuel cell, has not been considered.

Accordingly, it is an object of this invention to disclose an exhaust treatment system for adsorbing contaminants from a molten carbonate fuel cell (MCFC) system including a filter system and an oxidation catalyst.

It is a further object of the invention to disclose a filter system for filtering an exhaust stream of a MCFC which absorbs alkali carbonate contaminants, which system comprises a filter substrate, an inorganic adsorbent secured to the filter substrate by an inorganic binder and an acidic material.

It is a still further object of the invention to disclose a filter system contained in the exhaust treatment system for adsorbing specific contaminants from an exhaust stream of a MCFC prior to passage of the exhaust stream through an oxidation catalyst comprising a filter substrate, a high surface area inorganic adsorbent secured to the filter substrate by an inorganic binder and an inorganic acid secured to the filter substrate.

It is a still further object of the invention to disclose a process for filtering contaminants which are present in an exhaust stream of a MCFC by passing the exhaust fuel stream through an exhaust treatment system.

It is a still further object of the invention to disclose a process for filtering contaminants which are present in the exhaust stream of a MCFC comprising passing a fuel stream through the MCFC and filtering contaminants from the exhaust stream by use of a filter system of an exhaust treatment system prior to passing the filtered exhaust stream through an oxidation catalyst system.

It is a still further object of the invention to disclose a process for preparing a filter system of an exhaust treatment system for filtering exhaust gases from a MCFC comprising preparing a filtering substrate, coating the filtering substrate with an inorganic adsorbent by use of an inorganic binder and treating the coated filter substrate with an acidic material.

It is a further object of the invention to disclose a process for preparing a filter system for filtering exhaust gases from a MCFC prior to passage of the exhaust gases through an oxidation catalyst comprising preparing a filter substrate and coating the filter substrate in a single coating step with a solution comprising an inorganic adsorbent, an inorganic acidic material and an inorganic binder.

These and other aspects of the invention are obtained by various designs of the filter system, the process of its manufacture and the process of its use.

SUMMARY OF THE INVENTION

The present invention is an exhaust treatment system, utilized in a MCFC for adsorbing contaminants given off by the MCFC, wherein the filter system comprises a filter substrate, an inorganic adsorbent secured to the filter substrate by an inorganic binder, and an acidic material coated onto the filter substrate. Preferably, the inorganic adsorbent is a high surface area inorganic adsorbent and the acidic material is an inorganic acid.

The present invention is also a process for filtering contaminants contained in an exhaust stream of a MCFC comprising passing a fuel stream through the MCFC and filtering contaminants from the exhaust stream by use of a filter system, wherein the filter system comprises a filter substrate, an inorganic adsorbent secured to the filter substrate by an inorganic binder and an acidic material coated onto the filter substrate. After filtration, at least a substantial portion of the exhaust stream passes through an oxidation catalyst to remove other contaminants from the exhaust stream.

The present invention also is a process for preparing a filter system for filtering the exhaust stream from a MCFC, which process comprises preparing a filter substrate, coating the filter substrate with an inorganic adsorbent by use of an inorganic binder, and treating the coated filter substrate with an acidic material. In an alternate preferred process the acidic material is blended with the inorganic adsorbent and the inorganic binder and coated onto the filter substrate in a single process step.

DETAILED DESCRIPTION OF THE INVENTION

The present invention relates to an exhaust treatment system used in a molten carbonate fuel cell (MCFC) system. Typical MCFC include a fuel system feed line, a reformer catalyst, a molten carbonate fuel cell, a burner for that system and an exhaust stream. The MCFC can contain either a single MCFC cell or a plurality of MCFC cells which are typically connected in series. Each fuel cell of the MCFC has an anode chamber, a cathode chamber, an anode, a cathode and a molten carbonate electrolyte disposed there between and in intimate contact with the anode and the cathode.

Operation of the MCFC system requires the introduction of a fuel stream and water vapor to the reformer. The fuel feed stream is generally a conventional hydrocarbon fuel, such as natural gas, propane, coal gas or others. As the fuel typically contains sulfur impurities, it is preferred to desulfurize the fuel prior to introducing it into the MCFC by use of a sulfur adsorbent, such as is disclosed in U.S. Pat. No. 5,308,456. Following desulfurization, the fuel stream contacts the reformer catalyst where it reacts in an endothermic reaction to form hydrogen, carbon dioxide and carbon monoxide. Heat for this endothermic reaction is preferably provided at least partially by combustion of exhaust waste gases from the anode exhaust recycle stream. The reformer catalyst is a conventional steam reformer catalyst, which may be formed from a blend of a nickel-based catalyst and a noble metal, such as platinum, ruthenium, palladium, rhodium, among others. There are three conventional options for reforming fuels for MCFC systems: external reforming, direct internal reforming and indirect internal reforming.

The reformed fuel stream, containing hydrogen and carbon monoxide, contacts the anode which is a conventional catalyst for use within a MCFC. At the anode the hydrogen or carbon monoxide reacts with carbonate ions to form carbon dioxide, water and free electrons. The water, carbon dioxide, unconverted hydrogen, carbon monoxide, hydrocarbons and by-products then exit the anode chamber as anode exhaust. A portion of the anode exhaust may be recycled to the reformer while the remaining anode exhaust stream is directed to the burners. The cathode exhaust recycle stream supplies oxygen necessary for operation of the burner. The combined stream is directed to the burner where it is burned to form water, carbon dioxide and other by-products. The burner is typically a catalytic burner containing a combustion catalyst in the form of pellets or honeycomb monolith. Burners typically operate at temperatures between about 600° and 860° C., preferably around 650° C.

The oxygen combustion stream is introduced into the cathode chamber. At the cathode, the stream intimately contacts a conventional catalyst where oxygen and carbon dioxide in the stream react with the free electrons which are passed from the anode to produce carbonate ions. These carbonate ions migrate across the molten carbonate electrolyte to the anode where they react with hydrogen and carbon monoxide to form water, carbon dioxide and free electrons. The feed stream exits the cathode chamber as a cathode exhaust stream, most of which is vented.

The exhaust stream from the MCFC is preferentially passed through an oxidation catalyst for the removal of hydrogen, carbon monoxide and hydrocarbons. However, during normal procedures components of the electrolyte mixture, usually lithium carbonate and potassium carbonate, are also present in the exhaust stream as contaminants. It is important that these inorganic contaminants be removed from the exhaust stream prior to its passage through the exhaust steam oxidation catalyst as these contaminants can deactivate this catalyst. The exhaust treatment system of the invention is designed to trap these contaminants given off by the MCFC as well as oxidizing hydrocarbons, hydrogen and carbon monoxide which are present in the exhaust stream.

The exhaust treatment system includes the filter system for trapping alkali carbonates and the oxidation catalyst. The filter system for adsorbing the carbonate contaminants is comprised of a filter substrate, an inorganic adsorbent secured to the filter substrate by an inorganic binder and an acidic material coated onto the filter substrate.

One limitation on the composition of the filter substrate is that the MCFC operates at temperatures above 600° C. Thus, the filter substrate must be selected from materials which are stable at these operating temperatures. Among the preferred substrate materials are conventional metallic filter substrates comprised of stainless steel, iron-chromium alloys and other alloys. In addition, nonmetallic filter substrates may also be utilized which are stable at the operating temperature of the MCFC, such as cordierite, ceramic, silicon carbide, alumina, zirconia, and mullite. Specific preferred embodiments of the composition of filter substrate that are useful include a stainless steel screen manufactured by McNichols Co. or a ceramic product manufactured by Praxair Inc.

The inorganic adsorbent which is coated onto the filter substrate is preferably a high surface area inorganic adsorbent, such as a high surface area alumina, silica, titania, titania-silica, silica-alumina, silica-zirconia, and zeolites, either modified or unmodified. The preferred inorganic adsorbent has a surface area of at least about 100 $m^2/g$, although lower surface area adsorbents can also be utilized. While lower surface area adsorbents, such as silica carbide, cordierite, alpha alumina and zirconia, may be used, higher surface area adsorbents are preferred for high efficiency performance.

For inorganic adsorbents to effectively filter contaminants in the exhaust stream of an MCFC, it is important that there be a strong adhesion between the inorganic adsorbent and the filter substrate. This strong adhesion is provided by the inorganic binder which binds the inorganic adsorbent to the filter substrate. Among the preferred inorganic binders are sols of alumina, silica, zirconia, titania and ceria and combinations thereof. Other binders may also be used, such as boehmite and aluminum nitrate. Further, depending upon the nature of the filter substrate and the inorganic adsorbent that is utilized, the binder system may also be formed from a combination of two or more different sols. The viscosity of the binder system depends on the type of filter substrate and inorganic binder that are utilized.

The inorganic adsorbent and binder are blended together conventionally for application to the filter substrate. Washcoating is the preferred method to apply the inorganic adsorbent to the filter substrate. The ratio of the adsorbent to the binder is preferably from about 100:1 to about 4:1, by weight. The washcoat slurry is prepared by blending the adsorbent and the binder with water followed by ballmilling or homogenization. The solids content of the washcoat slurry is typically about 20 percent to 50 percent, by weight.

Coating is performed by dipping the filter substrate into the slurry containing the inorganic adsorbent and the inorganic binder. Following dipping, the coated filter substrate is treated to remove excess slurry, for example, by air-knifing or suction filtration. Following the loading with the inorganic adsorbent and binder, the coated filter substrate is dried and calcined at a temperature of about 500° C. for about 30 minutes to 2 hours to fix the inorganic adsorbent onto the filter substrate. The process may be repeated two or more times to achieve the proper loading. The total washcoat loading is preferably about 2 $g/in^3$ (60 g/l) and can be in the range of about 0.5–4 $g/in^3$ (30–240 g/l), based on the geometric dimensions of the filter substrate.

The contaminants such as lithium carbonate or potassium carbonate which are present in the exhaust stream from the MCFC are generally basic materials. Thus, the activity of the filter element is enhanced by coating the filter element with an acidic material. The preferred acidic materials are inorganic acids. Such inorganic acids are preferred because of the high temperature at which the MCFC system is operated. In addition, because the exhaust stream from an MCFC also contains high levels of moisture, in a preferred embodiment the acid utilized is preferably not a water soluble acid, such as sulfuric acid or hydrochloric acid. Accordingly, in a preferred embodiment the inorganic acid is a non-water soluble acid with high thermal stability. In a more preferred embodiment, the acid is a heterophosphoric acid or a polyphosphoric acid, such as phosphomolybdic acid or phosphotungstic acid.

In one preferred process the acidic material is added to the coated metallic filter substrate after the inorganic adsorbent is secured to the surface of the filter substrate by impregnation. In an alternative preferred embodiment, the acidic material is added to the washcoat containing the inorganic adsorbent and the inorganic binder prior to the initial coating of the filter substrate.

If the inorganic acid is added in a separate step to the coated filter substrate, the coated filter substrate is impregnated with an aqueous solution containing the acidic material. The concentration of the acidic material on the coated filter substrate depends on the method of coating that is utilized. These methods are well recognized in the industry. After addition of the acidic material, the filter is dried and calcined at about 500° C. for about 2 hours.

The ratio of the inorganic adsorbent to inorganic binder on the filter substrate is preferably from about 100 to 1 to about 4 to 1 and more preferably from about 20 to 1 to 10 to 1, by weight. The ratio of the inorganic adsorbent to inorganic acid is preferably from about 200 to 1 to about 5 to 1, preferably from about 100 to 1 to about 10 to 1 and most preferably about 20 to 1.

An important feature of this filter system is that the pressure drop should be kept as low as reasonable. To achieve an acceptable pressure drop, preferably monolithic, either ceramic or metallic, supports are utilized for the filter system. Acceptable pressure drop depends on the specific design of the MCFC system that is utilized. The composition of the filter system should balance the need for a high loading with the maintenance of a low pressure drop.

The filter system comprising a filter substrate onto which an inorganic adsorbent has been secured by an inorganic binder and onto which an inorganic acid has been secured is useful as an element of the exhaust treatment system for adsorbing contaminants from the exhaust stream from a molten carbonate fuel cell system. After the coated filter is formed, it is placed on line.

The coated filter is designed to remove inorganic contaminants, such as lithium or potassium carbonate, from the feed stream down to levels of about 1 ppm. Without the use of the filter system of the invention, the carbonates deposited on the oxidation catalyst can reach levels of up to 4–5 percent loading after a few months operation. Further, if not filtered, the carbonates may also damage other components of the fuel cell system.

Once the filter system has been utilized on stream for a significant period of time, it may be regenerated. Regeneration can be performed by washing the loaded filter system with deionized water followed by drying.

As discussed above, the coated filter is designed to filter the exhaust stream from a MCFC prior to passage of that exhaust stream through an oxidation catalyst. The oxidation catalyst utilized as an element of the exhaust treatment system is designed to remove unconverted hydrogen, carbon monoxide and hydrocarbons from the exhaust stream. The oxidation catalyst utilized in this system is a conventional catalyst designed for the removal of these contaminants from the exhaust stream of a fuel cell. For example, such catalysts are often comprised of precious metals loaded onto a conventional support, such as an alumina support, as disclosed for example in U.S. Pat. Nos. 6,010,675, 6,299, 995 and 6,254,807.

Modifications may be made to the present invention which will occur to those skilled in the art. Such inventions are within the scope of the invention as defined in the appended claims.

What is claimed is:

1. A filter system for adsorbing contaminants from a molten carbonate fuel cell exhaust stream comprising
   a filter substrate coated with a material, wherein the material comprises
   an inorganic adsorbent secured to the filter substrate by an inorganic binder, and
   an acidic material coated onto the filter substrate, wherein the acidic material comprises a non-water soluble inorganic acid.

2. The filter system of claim 1 wherein the composition of the filter substrate is selected from a group of materials consisting of ceramic, alumina, titania, zirconia, boria, corundum, silica, magnesia, silica-zirconia, titania-zirconia, titania-silica, silica-alumina, silicon carbides, cordierite, mullite, and metallic filters, such as stainless steel, iron chromium alloy and other metallic alloy filters and mixtures and combinations thereof.

3. The filter system of claim 1 wherein the filter substrate comprises a metallic filter.

4. The filter system of claim 1 wherein the inorganic adsorbent is selected from the group consisting of alumina, silica, titania, titania-silica, silica-alumina, zirconia silica-zirconia, ceria, and zeolites, either modified or unmodified.

5. The filter system of claim 1 wherein the inorganic adsorbent comprises a high surface area material selected from the group consisting of alumina, silica, titania, zirconia, ceria, titania-silica, silica-alumina, silica-zirconia and zeolites.

6. The filter system of claim 1 wherein the inorganic adsorbent comprises a high surface area alumina with a surface area greater than about 100 $m^2/g$.

7. The filter system of claim 1 wherein the inorganic binder for binding the inorganic adsorbent to the filter substrate is selected from the group consisting of sols of alumina, silica, zirconia, ceria, titania, boehmite and aluminum nitrate, and blends of two or more different binders.

8. The filter system of claim 1 wherein the filter substrate comprises a stainless steel screen and the inorganic binder comprises ceria.

9. The filter system of claim 1 wherein the acidic material comprises a non-water soluble inorganic acid.

10. A filter system for adsorbing contaminants from a molten carbonate fuel cell exhaust stream comprising
    a filter substrate coated with a material, wherein the material comprises
    an inorganic adsorbent secured to the filter substrate by an inorganic binder, and
    an acidic material coated onto the filter substrate, wherein the acidic material comprises heteropolyphosphoric acid.

11. The filter system of claim 1 wherein the inorganic adsorbent comprises about 60 to about 95 percent, the inorganic binder comprises about 5 to about 40 percent and the acidic material comprises about 0.1 to about 20 percent of the material coated on the filter substrate.

12. The filter system of claim 1 wherein the inorganic adsorbent comprises about 80 to about 95 percent, the binder comprises about 1 to about 20 percent and the acidic material comprises about 0.1 to about 5 percent of the material coated on the filter substrate.

13. A filter system for adsorbing contaminants from an exhaust system from a molten carbonate fuel cell prior to passage of the exhaust stream through an oxidation catalyst comprising
    a filter substrate,
    a high surface area inorganic adsorbent secured to the filter substrate by an inorganic binder, and
    an inorganic acidic material coated onto the filter substrate, wherein the inorganic acidic material comprises a non-water soluble inorganic acid.

14. A process for filtering contaminants which are present in an exhaust stream of a molten carbonate fuel cell comprising
    passing a fuel stream through the molten carbonate fuel cell,
    passing at least a portion of an exhaust stream containing inorganic contaminants through a filter system, and
    filtering the inorganic contaminants from the exhaust stream by use of the filter system, wherein the filter system comprises a filter substrate, an inorganic adsorbent secured to the filter substrate by an inorganic binder and an acidic material coated onto the filter substrate.

15. The process of claim 14 further comprising passing at least a portion of the filtered exhaust stream after passage through the filter system through an oxidation catalyst system.

16. An exhaust treatment system for adsorbing contaminants from a molten carbonate fuel cell comprising the filter system of claim 1 and an oxidation catalyst.

17. An exhaust treatment system for adsorbing contaminants from a molten carbonate fuel cell comprising the filter system of claim 13 and an oxidation catalyst.

18. A process for filtering contaminants which are present in an exhaust stream of a molten carbonate fuel cell comprising passing a fuel stream through the molten carbonate fuel cell which generates an exhaust stream containing inorganic contaminants, passing at least a portion of the exhaust stream containing inorganic contaminants through a filter system, filtering the inorganic contaminants from the exhaust stream by use of the filter system, wherein the filter system comprises a filter substrate, an inorganic adsorbent secured to the filter substrate by an inorganic binder and an acidic material coated onto the filter substrate and passing the filtered exhaust stream through an oxidation catalyst.

19. A process for preparing an exhaust treatment system for filtering exhaust gases from a molten carbonate fuel cell comprising preparing a filter system comprising a filter substrate coated with a material, wherein the material comprises an inorganic adsorbent secured to the filter substrate by an inorganic binder, and an acidic material coated onto the filter substrate, wherein the acidic material comprises an inorganic acid, preparing an oxidation catalyst for fuel cells, and placing the filter system and the oxidation catalyst on-line to filter the exhaust gases from the molten carbonate fuel cell.

20. A filter system for adsorbing contaminants from a molten carbonate fuel cell exhaust stream consisting essentially of a filter substrate coated with a material, wherein the material comprises an inorganic adsorbent secured to the filter substrate by an inorganic binder, and an acidic material coated onto the filter substrate.

21. The process of claim 14 wherein the composition of the filter substrate is selected from a group of materials consisting of ceramic, alumina, titania, zirconia, boria, corundum, silica, magnesia, silica-zirconia, titania-zirconia, titania-silica, silica-alumina, silicon carbides, cordierite, mullite, and metallic filters, such as stainless steel, iron chromium alloy and other metallic alloy filters and mixtures and combinations thereof.

22. The process of claim 14 wherein the filter substrate comprises a metallic filter.

23. The process of claim 14 wherein the inorganic adsorbent is selected from the group consisting of alumina, silica, titania, titania-silica, silica-alumina, zirconia silica-zirconia, ceria, and zeolites, either modified or unmodified.

24. The process of claim 14 wherein the inorganic adsorbent comprises a high surface area material selected from the group consisting of alumina, silica, titania, zirconia, ceria, titania-silica, silica-alumina, silica-zirconia and zeolites.

25. The process of claim 14 wherein the inorganic adsorbent comprises a high surface area alumina with a surface area greater than about 100 $m^2/g$.

26. The process of claim 14 wherein the inorganic binder for binding the inorganic adsorbent to the filter substrate is selected from the group consisting of sols of alumina, silica, zirconia, ceria, titania, boehmite and aluminum nitrate and blends of two or more different binders.

27. The process of claim 14 wherein the filter substrate comprises a stainless steel screen and the inorganic binder comprises ceria.

* * * * *